(12) United States Patent
Fanghaenel (10) Patent No.: US 10,963,454 B2
(45) Date of Patent: Mar. 30, 2021

(54) SYSTEM AND METHOD FOR BULK REMOVAL OF RECORDS IN A DATABASE

(71) Applicant: salesforce.com, inc., San Francisco, CA (US)

(72) Inventor: Thomas Fanghaenel, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 240 days.

(21) Appl. No.: 16/140,523

(22) Filed: Sep. 24, 2018

(65) Prior Publication Data

US 2020/0097558 A1  Mar. 26, 2020

(51) Int. Cl.
*G06F 16/23* (2019.01)
*G06F 16/21* (2019.01)
*G06F 16/22* (2019.01)
*G06F 16/2455* (2019.01)

(52) U.S. Cl.
CPC ......... *G06F 16/2386* (2019.01); *G06F 16/21* (2019.01); *G06F 16/2246* (2019.01); *G06F 16/2282* (2019.01); *G06F 16/2365* (2019.01); *G06F 16/2456* (2019.01)

(58) Field of Classification Search
CPC ... G06F 16/2386; G06F 16/21; G06F 16/2246
See application file for complete search history.

(56) References Cited

U.S. PATENT DOCUMENTS

| | | | |
|---|---|---|---|
| 9,400,816 B1* | 7/2016 | Gubarev | G06F 16/2228 |
| 2004/0019589 A1* | 1/2004 | Basrur | G06F 16/80 |
| 2005/0223022 A1 | 10/2005 | Weissman | |
| 2017/0060569 A1 | 3/2017 | Piccinini | |
| 2017/0315740 A1* | 11/2017 | Corsi | G06F 3/0688 |
| 2018/0129585 A1 | 5/2018 | Martin | |
| 2018/0260407 A1 | 9/2018 | Hofhansl | |

OTHER PUBLICATIONS

International Search Report and Written Opinion for Application No. PCT/US2019/052455, dated Dec. 13, 2019, 12 pages.
International Search Report and Written Opinion for Application No. PCT/US2019/052733, dated Dec. 11, 2019, 15 pages.

(Continued)

*Primary Examiner* — Loc Tran
(74) *Attorney, Agent, or Firm* — Butzel Long; Donald J. Lecher (57) ABSTRACT

A method of deleting a plurality of records in a log-structured merge (LSM) tree based storage system during a merge operation that writes data from a memory storage to an extent, includes receiving a command to delete a plurality of records, inserting a range tombstone into the memory storage component of the storage system, the range tombstone indicating the plurality of records to be deleted, selecting one or more delayed deletion processes based at least in part on whether the plurality of records is contiguous beyond a predetermined threshold amount, modifying a manifest of the storage system based on the selected delayed deletion process, and performing the merge operation, wherein the plurality of records is not written to the extent during the flush operation based at least in part on the delayed deletion process.

3 Claims, 4 Drawing Sheets

(56) References Cited

OTHER PUBLICATIONS

O'Neil P et al: "The log-structured merge-tree (LSM-tree)", ACTA Informatica, Springer Verlag, DE, vol. 33, No. 4, Jun. 1, 1996 (Jun. 1, 1996), pp. 351-385, XP009122594, ISSN: 0001-5903.
Alex Dejanovski: "Undetectable tombstones in Apache Cassandra", Jul. 5, 2018 (Jul. 5, 2018), XP055648338, Retrieved from the Internet: URL:https://thelastpickle.com/blog/2018/07/05/undetectable-tombstones-in-apache-cassandra.html [retrieved on Dec. 2, 2019].
Wang Jin et al: "pLSM: A Highly Efficient LSM-Tree Index Supporting Real-Time Big Data Analysis", 2013 IEEE 37th Annual Computer Software and Applications Conference, IEEE, Jul. 22, 2013 (Jul. 22, 2013), pp. 240-245, XP032517890, DOI: 10.1109/COMPSAC.2013.40 [retrieved on Oct. 28, 2013].

\* cited by examiner

SYSTEM AND METHOD FOR BULK REMOVAL OF RECORDS IN A DATABASE

BACKGROUND

Data structures are organizations of data that provide a variety of ways to interact with the data stored therein. Data structures can be designed for various purposes, for example, to facilitate efficient searches of the data, such as in a binary search tree, to permit efficient storage of sparse data, such as with a linked list, or to provide efficient storage of searchable data such as with a B-tree.

Data structures that utilize a key-value paradigm accept a key-value pair and are configured to respond to queries for the key. Key-value data structures may include such structures as dictionaries (e.g., maps, hash maps, etc.) in which the key is stored in a list that links (or contains) the respective value. While these structures are useful in-memory (e.g., in main or system state memory as opposed to storage), storage representations of these structures in persistent storage (e.g., on-disk) may be inefficient. Accordingly, a class of log-based storage structures have been introduced. One example is the log structured merge tree (LSM tree).

An LSM tree database may consist of one or more disk-resident immutable layers ("extents") in addition to a mutable memory-resident memory layer. When reading from an LSM tree, a reader may read and merge results from all layers. Corresponding index entries are added to the mutable memory-resident layer when a new record is indexed.

Transactions in an LSM tree database are stored as immutable versions of given records. Immutable versions of contents of records already stored on the system may remain unchanged until the contents are deleted (if ever) from the system. That is, a received transaction may create a new version of the contents of the record to be stored in the system, instead of altering the contents of the record. Thus, it may be possible for multiple versions of a record (e.g., records having different contents) to have identical keys except for transaction identifiers (e.g., which may include transaction numbers).

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

The disclosed methods and techniques can be applied to a variety of different database structures. The disclosed subject matter is not limited to a single type of architecture, but for illustrative purposes, the discussion below will describe implementation using a log structured merge (LSM) tree with key-range multi-tenancy. LSM-trees are capable of describing data changes with immutable data versions. Key-range multi-tenancy allows dynamic binding to servers and can be used to keep each tenant's data separate.

Deletions of single records in LSM-tree based databases are done by writing a deletion marker (referred to as a "tombstone"). However, writing deletion markers for every record is an inefficient mechanism for bulk or mass deletions caused by, for example, a DROP TABLE or DROP INDEX command that can result in large numbers or records being deleted. Ideally, from a user's perspective such commands should be constant-time operations, not linear or dependent upon the size of the underlying table or index.

The disclosed embodiments address the technological problem of bulk deletions of arbitrarily large numbers of records by introducing the concept of "range tombstones." Range tombstones are records that mark a plurality of records for deletion, e.g., all records in a given table or all records associated with a given tenant. A record can be marked as a "range tombstone" record by, for example, a flag or a special header bit. Otherwise, a range tombstone record can be given the attributes of and treated as a normal record. For example, it can be marked with a transaction identifier (XID) of the transaction that executes the DROP, and get stamped with the appropriate transaction number (XCN) when the transaction commits. One range tombstone can be created for each key range effected by the DROP command.

Range tombstones can be used to implement at least two different mechanisms for bulk/mass deletions, referred to herein as "key range slicing" and "deferred deletion." Both mechanisms provide constant-time feedback to the end user by deferring the actual work that needs to be done. But they differ in their performance characteristics, making them suitable for different types of mass or bulk deletions that can occur in a database system.

Figure 1:
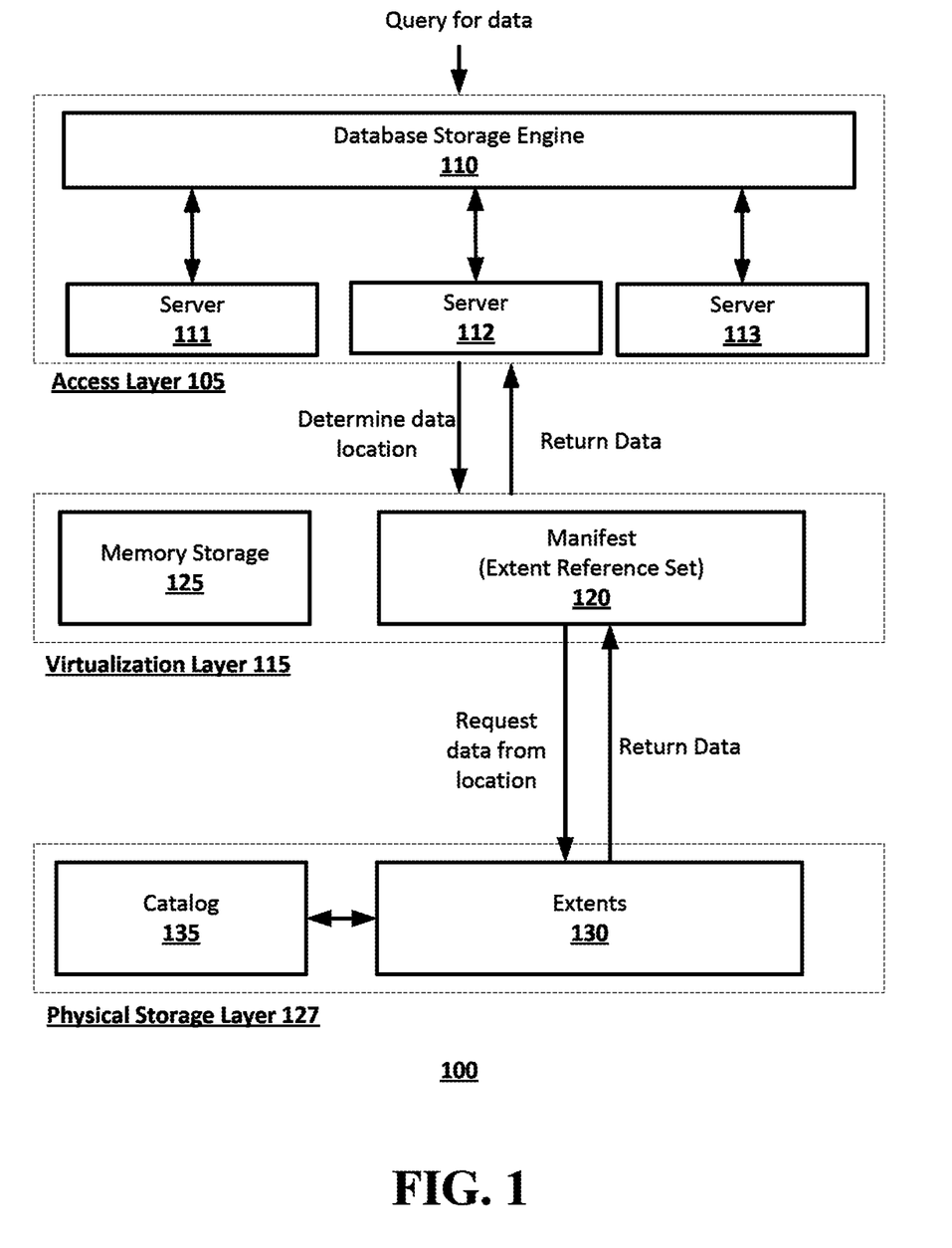
FIG. 1 shows an example database system according to an implementation of the disclosed subject matter.

FIG. 1 shows an example system 100 that can be improved by implementing the disclosed range tombstones for mass removal of records. Immutable versions of data are stored in "extents" on the system 100. An "extent" refers to a region of storage, typically continuous within a storage medium, which can be used to store data. As will be described below, an "extent reference" may be used as a logical reference to a physical extent that is stored in a physical storage, and may be used to virtualize access to the physical storage into one or more "levels" in the storage through which data migrates over time as part of database maintenance and optimization processes.

The system 100 can operate on a single computing device or multiple connected computing devices. For example, the system 100 can be implemented on a laptop, a desktop, an individual server, a server cluster, a server farm, or a distributed server system, or can be implemented as a virtual computing device or system, or any suitable combination of physical and virtual systems. For simplicity, various parts, such as the processor, the operating system, and other components of the database management system are not shown in FIG. 1.

Figure 4:
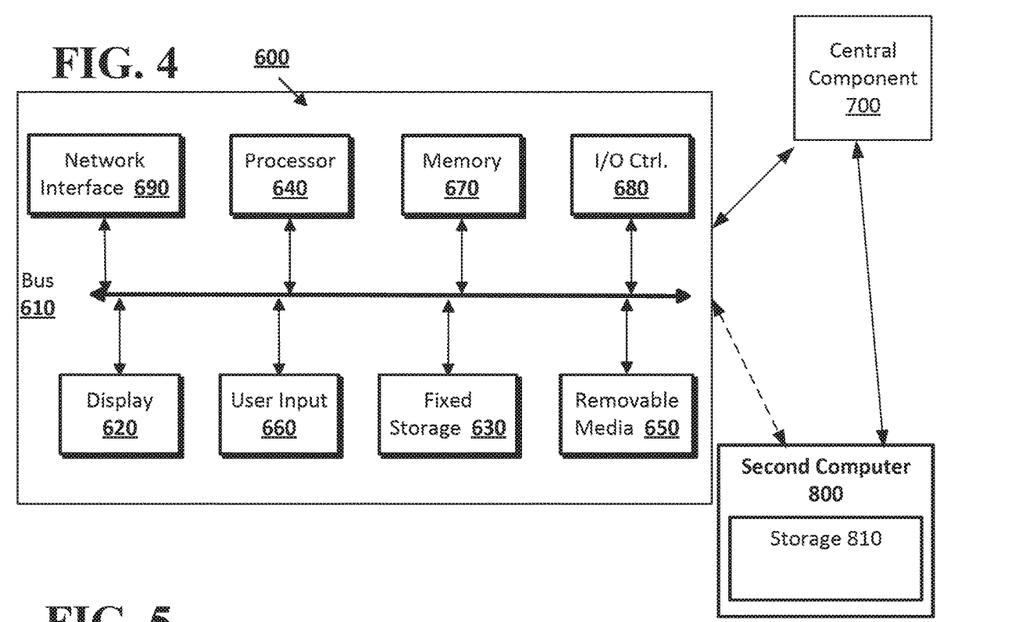
FIG. 4 shows a computer according to an implementation of the disclosed subject matter.
Figure 5:
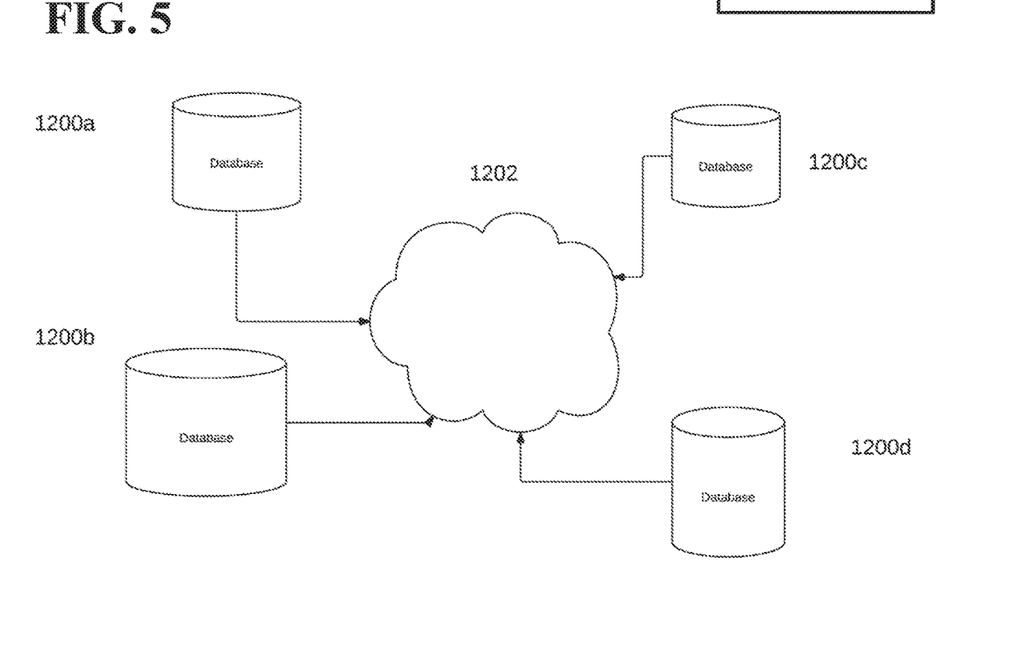
FIG. 5 shows a network configuration according to an implementation of the disclosed subject matter.

The system 100 can be part of a computing system and network infrastructure, or can otherwise be connected to a separate computing system and network infrastructure, including a larger server network, which can include other server systems similar to system 100. In some implementations, the system 100 can be the computer 600, central component 700, and or the second computer 800 shown in FIG. 6, and/or one or more of the database systems 1200a-1200d shown in FIG. 7.

The system 100 includes an access layer 105, a virtualization layer 115, and a physical storage layer 127. The access layer 105 can include one or more servers 111, 112, 113 that provide a platform for tenants to host applications and databases on and function as a primary interface for users to interact with the system 100. The access layer 105 can also include a database storage engine 110 that can handle load balancing across the servers 111, 112, 113 and can accept and process a query for the system 100 from a computing device (e.g., computer 600 and/or a second computer 800 shown in FIG. 6). For example, the database storage engine 110 can receive a query from a tenant organization and process the query to transmit a command to the virtualization layer 115. The database storage engine 110 can be any suitable combination of hardware and software on the server system 100 for receiving queries for the database system and retrieving data related to the received query.

The virtualization layer 115 virtualizes tenant data to provide each tenant with system services, such as customized databases, that allow the tenant to access only the tenant's own data even though data from multiple tenants may be stored in the system 100. The virtualization layer can include an extent reference set 120 (a component of a manifest) and a memory storage 125. In some implementations, the manifest and memory storage 125 can be stored in the central component 700 shown in FIG. 6 and/or database systems 1200a-1200d shown in FIG. 7.

The memory storage 125 stores an initial version of data before the data is recorded to an extent in the persistent physical storage layer 127. That is, data transactions, such as insertion of new records or insertion of tombstones, occur at the memory storage 125 level. Over time, in order to optimize use of the memory storage 125, flush operations transfer data out of the memory storage 125 to a top level extent 130 in the physical storage level 127, and merge operations transfer data between extents 130 as part of database maintenance operations. In virtualization terms it can thus be said that newer data resides near the "top" of the tree or at the "upper levels" of the database, while older data resides near the "bottom" of the tree, or the "lower levels" of the database. It should be understood, however, that this terminology is merely used as an aid in conceptualization and does not necessarily have any bearing on actual physical location of data relative to each other in the database.

The manifest contains an extent reference set 120 that can use metadata from tenant data to define where extents 130 are located in the persistent physical storage 127 (i.e., where tenant data is stored as part of extents 130). The metadata can include, for example, key ranges that define which keys are visible in an extent, transaction numbers (herein referred to as "XCN's") that indicate a transaction order of the records/tombstones in the extents 130, and tenant identifier (ID) data that associate the extent with a given tenant.

The virtualization layer 115 can receive a query from the database storage engine 110 and find requested data by checking whether the most recent version of the data is in memory storage 125 or, by referring to the extent reference set 120, checking whether the most recent version of the data has already been flushed to extents 130 in the physical storage layer 127. The query can be received, for example, from an authorized user of the database system who is associated with at least one tenant. If the data has already been flushed to physical storage 127, the virtualization layer 115 can locate the requested data based on metadata in the manifest extent reference set 120. That is, the virtualization layer 115 can retrieve the data requested by the query from the extent 130 and can return the data to the database storage engine 110, which can provide it to, for example, the computing device that transmitted the query to the database system.

The persistent physical storage layer 127 can include an immutable data storage device and can be implemented, for example, as a semiconductor memory, a solid state drive (SSD), hard disk drive, optical memory, an optical storage device, or any other suitable physical data storage medium, or some combination thereof. The physical storage layer 127 can implement the extents 130, which contain the immutable versions of tenant data. The physical storage layer 127 can also include a catalog 135 to store past versions of manifests, manage the identity and lifetime of the extents 130, and track data capacity to manage hardware, such as storage devices and servers that can store the extents.

Since the data in the persistent physical storage 127 is immutable, when the system 100 executes a data transaction to modify stored data the system 100 creates and inserts a new version of the data into memory storage 125 instead of altering/deleting contents of the already-stored data. From the memory storage 125 the data matriculates to the physical storage 127 in a flush operation. Thus, it is possible for multiple versions of key-value data (e.g., each having different contents) as disclosed herein to have identical keys. Furthermore, by using an incremental sequential transactional number (XCN) to mark each transaction, the system 100 can distinguish among identical keys for versions of data. For example, a later version of a record will have a higher XCN than a previous version of a record, and both records will have identical keys, but potentially different content values.

When the system 100 executes an operation that requires a readout of data, the system 100 can execute a search temporally ordered by XCN. During a scan, when a tombstone is encountered the system 100 can disregard any previous records having the same key as the tombstone and a lower XCN than the tombstone. That is, the system will function as if the corresponding value is deleted, even if one or more expired versions of the key-value pair reside at an older location within the extents 130. Similarly, when a range tombstone is encountered the disclosed system 100 disregards records in the tombstoned key range. The disclosed system 100 will instead select and execute a delayed mass/bulk deletion process, based on various factors as will be discussed below.

As previously mentioned, the disclosed embodiments utilize what will be referred to herein as "key range slicing" and "deferred deletion" as delayed mass/bulk deletion processes. These processes enable provision of constant-time feedback to the end user by deferring the actual deletion work that needs to be done. However, the two processes differ in their performance characteristics, making each process suitable for different types of mass deletion contexts that can occur.

Database mass deletions contexts can arise in execution of various data definition language (DDL) commands, such as DROP TABLE, DROP INDEX, DROP TENANT, and DROP DATABASE. These drop-object type commands generally need to perform two main tasks: 1) update metadata in the manifest 120 to make the necessary schema changes, and 2) release the storage occupied in the extents 130 by the dropped object.

In the disclosed embodiments, the system 100 handles the first task immediately by updating the manifest 120 when the DDL command is received. The dropped object becomes inaccessible when the metadata update to the manifest 120 is committed. The second task, i.e. the removal of the actual records and the release of the storage space they occupy in the extents 130, is delayed. A new object with the same identity as the dropped object (i.e., same physical relation ID for tables and indexes, same database number for databases, same tenant ID for tenants) cannot be recreated until the next time the memory storage 125 (i.e., in-memory component of the LSM-tree) is flushed.

Due to clustering characteristics of data in the system 100 database, the release of the storage space of almost all the aforementioned object types generally follows one of two different storage patterns: a bulk deletion of records in a contiguous key range, or a mass deletion of records in a number of discontiguous key ranges. For example, DROP TABLE affects a contiguous key range if the target table is non-tenanted, but can affect many discontiguous key ranges if the table is a multi-tenant table. Similarly, DROP INDEX affects a contiguous key range if the index is on a non-tenanted table or it is a cross-tenant index on a multi-tenant table, but affects many discontiguous key ranges if the index is tenant-clustered. DROP TENANT generally affects a contiguous key range. DROP DATABASE generally affects a contiguous key range if the database does not contain any tenants, and can affect one additional separate key range per tenant that is registered in the database.

In the case of largely contiguous key ranges, the key range slicing process disclosed herein can be advantageous for removal of contiguous key ranges. In key range slicing, bulk removal of records is executed by updating the manifest 120 such that tombstoned key ranges are eliminated from the manifest 120. This is done by creating a new manifest during the flush operation that transfers records from memory 125 to physical storage extents 130. The new version of the manifest created by the flush operation can add a new reference to the storage extent just created by the flush operation and also modify, across all levels of the LSM trees, any existing extent references that cover tombstoned keys ranges.

In creating the new manifest, existing extent references are removed if they fall completely within one tombstoned key range, or recursively modified if they overlap with one or more boundaries of tombstoned key range. This recursive operation does the following: 1) if the lower/upper boundary of the extent reference falls within a tombstoned key range, a new reference is created with that boundary, adjusted such that it falls on the upper/lower bound of the tombstoned key range, or 2) if an extent reference completely covers a tombstoned key range, that reference is split into two new extent references, one with its upper boundary matching the lower boundary of the tombstoned key range, and the other with its lower boundary matching the upper boundary of the tombstoned key range.

Figure 2:
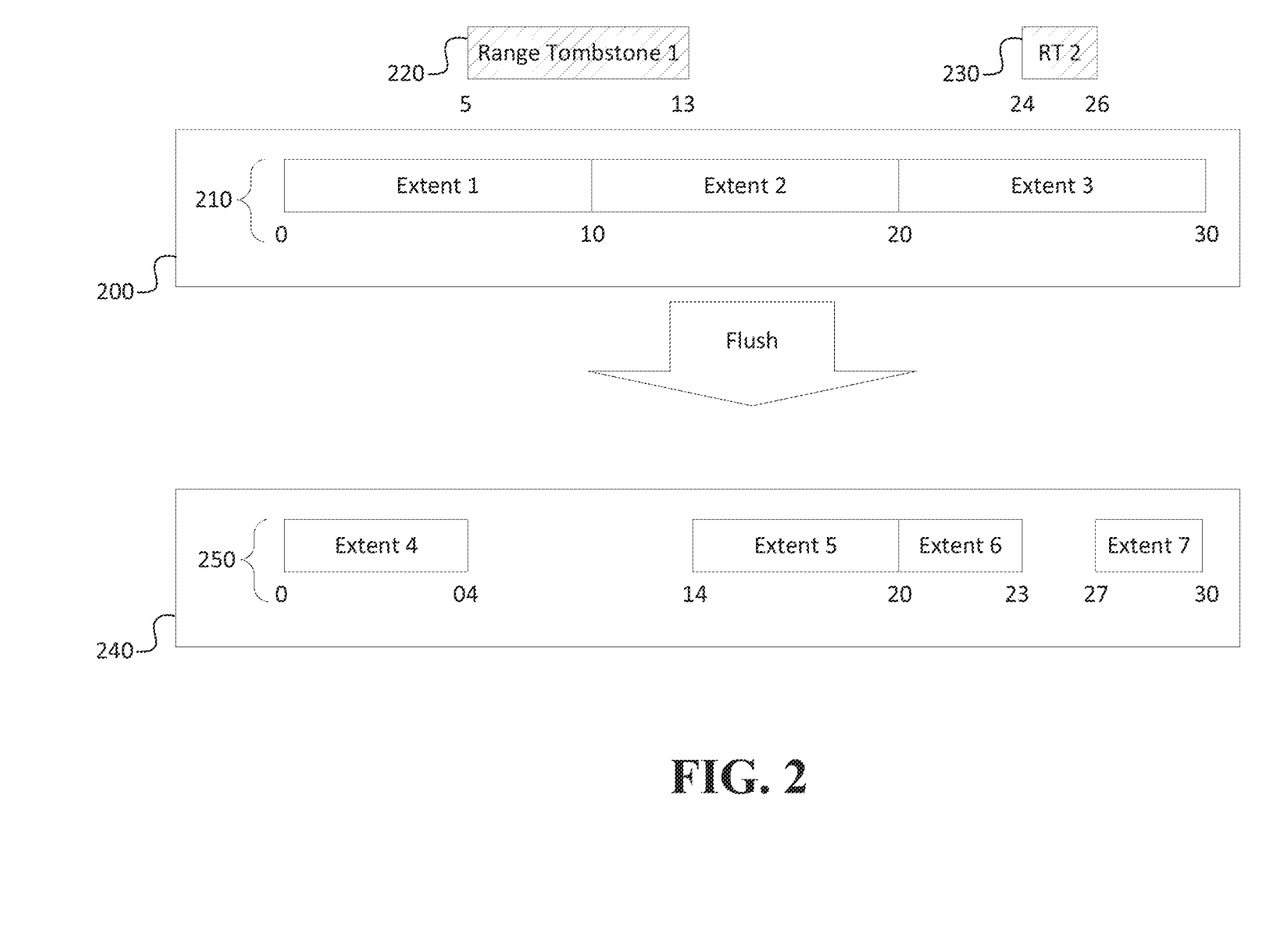
FIG. 2 shows key range slicing applied to an extent reference set in a manifest according to an implementation of the disclosed subject matter.

FIG. 2 depicts the disclosed key range slicing applied to an extent reference set 210 in a manifest 200. Extent 1 is defined as having a key range (0,10), Extent 2 is defined as having a key range (11,20) and Extent 3 is defined as having a key range (21,30). A first DROP command results in the insertion of a first range tombstone 220 that covers a key range (5,13). Since the upper boundary of the range tombstone 220 falls within the (0,10) key range of Extent 1 and the lower boundary falls within the (11,20) key range of Extent 2, the flush operation creates new extents that slice out the range tombstone key range. Thus, new extent Extent 4 is defined having a key range (0,4) and Extent 5 is defined having a key range (14,20).

A second DROP command results in the insertion of a second range tombstone 230 that covers a key range (24,26). In this case, since the extent reference for Extent 3 completely covers the range tombstone 230's key range, Extent 3 is divided into two new extents, Extent 6 (21,23) and Extent 7 (27,30). Extent 7's upper boundary matches the lower boundary of the tombstoned key range, and Extent 6's lower boundary matches the upper boundary of the tombstoned key range.

Thus, the disclosed key range slice renders any records in tombstoned key ranges inaccessible in the LSM tree, since the manifest no longer contains any entries for that key range. The storage space occupied by those records can be reclaimed later, for example, when a merge operation rewrites the key range around the slice boundaries and eventually the original extents that still hold the physical records of the tombstoned key ranges eventually expire.

While key range slicing is advantageous for contiguous key ranges, situations that call for a large number of DROP DDL's can result in excessive slicing that inflates the size of the manifest due to repeated inclusions of new extent references in the manifest. High numbers of extent references in the manifest can slow down processes, such as merge or flush operations, that need to manipulate the extended references set.

When mass deletions need to occur over sufficiently discontiguous key ranges, deferred deletion as disclosed herein can be advantageous. Deferred deletion refers to bulk removal of records carried out by annotating the manifest with additional data that indicates which object(s) are dropped while leaving the existing extent references unchanged. This annotation process can be executed during the flush operation.

The new version of the manifest, created by the flush operation, includes identifiers for any objects for which range tombstones were found in the in-memory component of the LSM tree, along with the log-stream-relative timestamp of when the object(s) were dropped. Subsequent scans in the persistent physical storage of the LSM tree can qualify records against the list of dropped objects, effectively filtering out records belonging to objects that are too old to be seen by the current scan.

Figure 3:
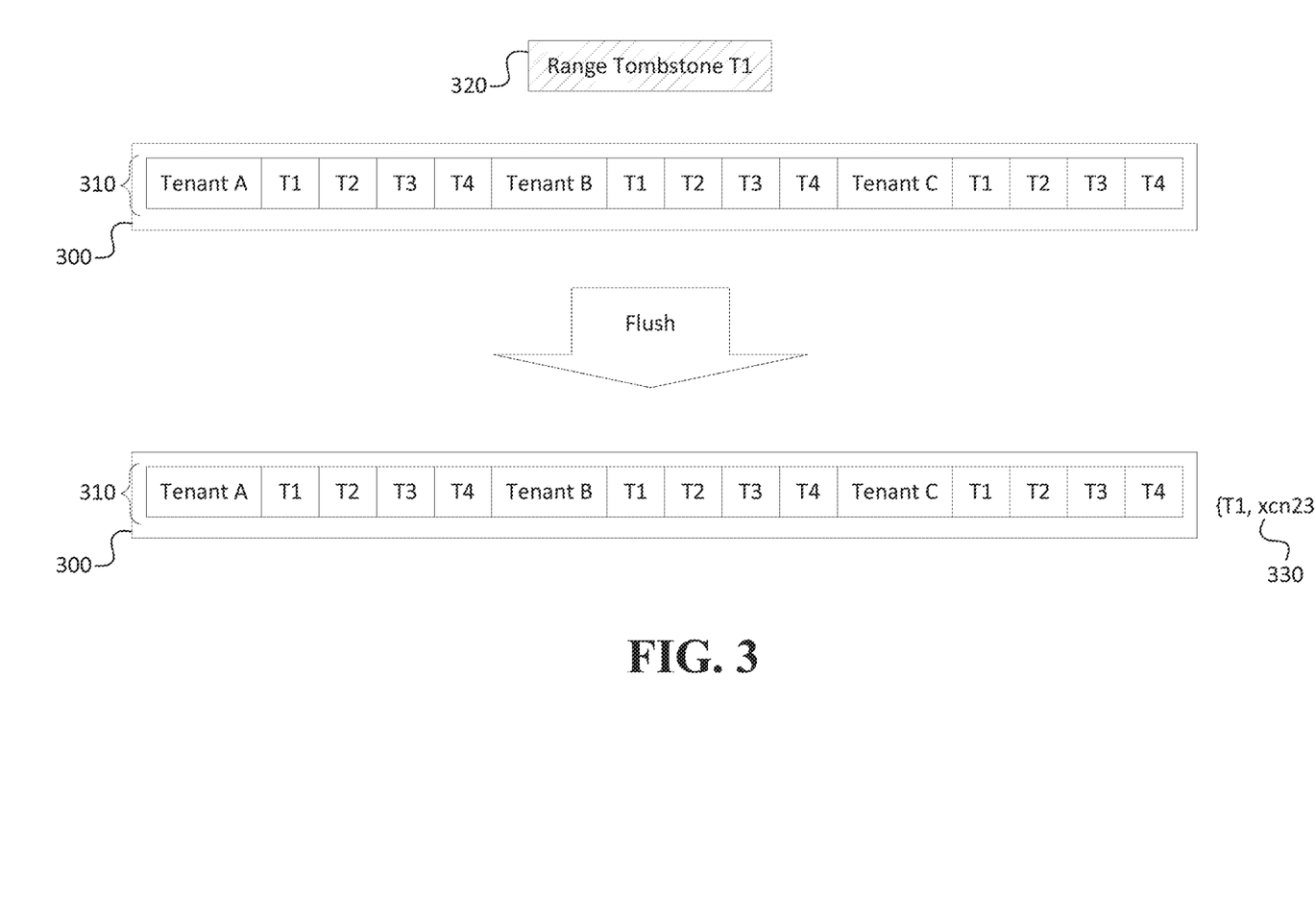
FIG. 3 shows deferred deletion applied to an extent reference set in a manifest according to an implementation of the disclosed subject matter.

FIG. 3 depicts the disclosed deferred deletion process applied to an extent reference set 310 in a manifest 300. The extent reference set includes data tagged for tenants A, B and C, each tenant having data in tables T1, T2, T3 and T4. A DROP TABLE command to delete table T1 inserts a range tombstone identifying table T1 for deletion. The flush operation annotates the manifest 300 with data identifying table T1 for deletion, without modifying the extent reference set 310. Subsequent scans of data mapped by the extent reference set 310 will first check the annotation 330 to determine whether read data has been marked for deferred deletion. Any data that is read as being associated with table T1 will not be outputted.

Accordingly, records in dropped key ranges are not hidden immediately by the disclosed deferred deletion process. Low-level storage scans can still see and find the dropped records, but they are prevented from returning the records to the execution engine (or the client) for as long as they continue to exist. Actual storage space reclamation is carried out similar to how it occurs in the ordinary tombstone and the key range slicing processes. When merges encounter the key ranges containing records of dropped objects, those records are skipped and not re-written to the new extent(s).

The disclosed key range slicing and deferred deletion approaches are similar in some regards. Both of them effectively hide all records corresponding to dropped objects immediately by executing schema updates, e.g., by removing/modifying metadata necessary to gain access to the dropped objects. Both processes prevent creation of new objects with matching identities to recently dropped ones until at least one flush operation has taken place.

The two processes differ in how they impact the manifest, and how efficiently subsequent merges can be executed when they encounter key ranges that correspond to dropped objects. The disclosed key range slicing process adds overhead to the storage manifest for each tombstoned key range. The overhead can lead to bloat of the manifest, which in turn can negatively impact the performance of queries as well as of subsequent operations that rewrite the manifest (due to increase in processing time corresponding to the increase in size of the manifest). However, key range slicing provides the advantage of merge operations remaining efficient when they encounter dropped key ranges. The merge operations do not need to read records in the dropped key ranges one-by-one to determine whether the records are dropped.

The disclosed deferred deletion process eliminates the overhead in the storage manifest, thereby keeping queries efficient and ensuring that storage manifest rewrites remain fast. However, it can negatively impact performance of merge operations that encounter dropped key ranges, since merge operations will still need to read each record in dropped key ranges one-by-one.

The most efficient way to drop a database object that includes a plurality of records depends on many factors, such as the number of affected key ranges and the number of records within those key ranges. The disclosed key range slicing approach is best used when the affected key ranges are wide, and each contain a relatively large amount of records. The disclosed deferred deletion approach is best applied to operations that affect a very large number of relatively small, discontiguous key ranges with few records in them.

The disclosed system 100 can use a heuristic to determine which delayed deletion process to use. For example, in one embodiment deferred deletion can be used for all DROP operations that affect a tenant-clustered object (i.e. multi-tenant tables or tenant-clustered indexes), while key range slicing can be used by all other DROP operations. In another embodiment the system can select a delayed deletion process based on whether the plurality of records is contiguous beyond a predetermined threshold amount.

Implementations of the presently disclosed subject matter may be implemented in and used with a variety of component and network architectures. FIG. 4 is an example computer 600 suitable for implementing implementations of the presently disclosed subject matter. The computer 600 may be a single computer in a network of multiple computers. As shown in FIG. 4, the computer 600 may communicate with a central or distributed component 700 (e.g., server, cloud server, database, cluster, application server, etc.). The central component 700 may communicate with one or more other computers such as the second computer 800, which may include a storage device 810. The second computer 800 may be a server, cloud server, or the like. The storage 810 may use any suitable combination of any suitable volatile and non-volatile physical storage mediums, including, for example, hard disk drives, solid state drives, optical media, flash memory, tape drives, registers, and random access memory, or the like, or any combination thereof.

Data, such as the records discussed above, may be stored in any suitable format in, for example, the storage 810, using any suitable filesystem or storage scheme or hierarchy. For example, the storage 810 may store data using a log structured merge (LSM) tree with multiple levels as described above. Further, if the systems shown in FIGS. 4-5 are multitenant systems, the storage may be organized into separate log structured merge trees for each instance of a database for a tenant. Alternatively, contents of all records on a particular server or system may be stored within a single log structured merge tree, in which case unique tenant identifiers associated with versions of records may be used to distinguish between data for each tenant. More recent transactions may be stored at the highest or top level of the tree and older transactions may be stored at lower levels of the tree. Alternatively, the most recent transaction or version for each record may be stored at the highest level of the tree and prior versions or prior transactions at lower levels of the tree.

The information obtained to and/or from a central component 700 may be isolated for each computer such that computer 600 may not share information with computer 800. Alternatively or in addition, computer 600 may communicate directly with the second computer 800.

The computer (e.g., user computer, enterprise computer, etc.) 600 includes a bus 610 which interconnects major components of the computer 600, such as a central processor 640, a memory 670 (typically RAM, but which may also include ROM, flash RAM, or the like), an input/output controller 680, a user display 620, such as a display or touch screen via a display adapter, a user input interface 660, which may include one or more controllers and associated user input or devices such as a keyboard, mouse, WiFi/cellular radios, touchscreen, microphone/speakers and the like, and may be closely coupled to the I/O controller 680, fixed storage 630, such as a hard drive, flash storage, Fibre Channel network, SAN device, SCSI device, and the like, and a removable media component 650 operative to control and receive an optical disk, flash drive, and the like.

The bus 610 enable data communication between the central processor 640 and the memory 670, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 600 can be stored on and accessed via a computer readable medium, such as a hard disk drive (e.g., fixed storage 630), an optical drive, floppy disk, or other storage medium 650.

The fixed storage 630 may be integral with the computer 600 or may be separate and accessed through other interfaces. A network interface 690 may provide a direct connection to a remote server via a telephone link, to the Internet via an internet service provider (ISP), or a direct connection to a remote server via a direct network link to the Internet via a POP (point of presence) or other technique. The network interface 690 may provide such connection using wireless techniques, including digital cellular telephone connection, Cellular Digital Packet Data (CDPD) connection, digital satellite data connection or the like. For example, the network interface 690 may enable the computer to communicate with other computers via one or more local, wide-area, or other networks, as shown in FIG. 5.

Many other devices or components (not shown) may be connected in a similar manner (e.g., data cache systems, application servers, communication network switches, firewall devices, authentication and/or authorization servers, computer and/or network security systems, and the like). Conversely, all of the components shown in FIG. 4 need not be present to practice the present disclosure. The components can be interconnected in different ways from that shown. Code to implement the present disclosure can be stored in computer-readable storage media such as one or more of the memory 670, fixed storage 630, removable media 650, or on a remote storage location.

FIG. 5 shows an example network arrangement according to an implementation of the disclosed subject matter. Four separate database systems 1200a-d at different nodes in the network represented by cloud 1202 communicate with each other through networking links 1204 and with users (not shown). Each of database systems 1200 may be operable to host multiple instances of a database, where each instance is accessible only to users associated with a particular tenant. Each of the database systems may constitute a cluster of computers along with a storage area network (not shown), load balancers and backup servers along with firewalls, other security systems, and authentication systems. Some of the instances at any of systems 1200 may be live or production instances processing and committing transactions received from users or from computing elements (not shown) for ingesting and providing data for storage in the instances.

The database systems, for example 1200c, may include at least one storage device, such as in FIG. 4. For example, the storage may include memory 670, fixed storage 630, removable media 650, a storage device included with the central component 700 and/or the second computer 800, and/or one or more storage devices associated with one or more of the database systems 1200a-1200d.

In some implementations, the one or more servers shown in FIGS. 4-5 may store the data in an immutable storage of the at least one storage device (e.g., a storage device associated with central component 700, the second computer 800, and/or the database systems 1200a-1200d) using a log-structured merge tree data structure.

The systems and methods of the disclosed subject matter may be for single tenancy and/or multi-tenancy systems. Multi-tenancy systems may allow various tenants, which may be, for example, users, groups of users, or organizations, to access their own records on the server system through software tools or instances on the server system that may be shared among the various tenants. The contents of records for each tenant may be part of a database for that tenant. Contents of records for multiple tenants may all be stored together within the same server system, but each tenant may only be able to access contents of records which belong to, or were created by, that tenant. This may allow a server system to enable multi-tenancy without having to store each tenants' contents of records separately, for example, on separate servers or server systems. The database for a tenant may be, for example, a relational database, hierarchical database, or any other suitable database type. All records stored on the server system may be stored in any suitable structure, including, for example, a LSM tree.

Further, a multitenant system may have various tenant instances on server systems distributed throughout a network with a computing system at each node. The live or production database instance of each tenant may have its transactions processed at one specific computer system. The computing system for processing the transactions of that instance may also process transactions of other instances for other tenants.

Some portions of the detailed description are presented in terms of diagrams or symbolic representations of operations on data within a computer memory. These diagrams, descriptions and representations are commonly used by those skilled in the data processing arts to most effectively convey the substance of their work to others skilled in the art. A computer-implemented process is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "writing," "reading," "receiving," "transmitting," "modifying," "updating," "sending," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Still more generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method of deleting records in a log-structured merge (LSM) tree based storage system during a merge operation that writes data from a memory storage component to an extent, comprising:
receiving a command to delete a plurality of records comprising a table, where each of the plurality of records are identified based on a prefix identifier common to each record in the table;
inserting at least one range tombstone into the memory storage component of the storage system, the at least one range tombstone indicating the plurality of records of the table to be deleted;
performing a flush operation that annotates a manifest of the storage system with data indicating the table that is deleted in the storage system and a time the table was deleted from the storage system, wherein the annotation does not affect extent references in the storage system;
bypassing, when reading data from the storage system prior to the merge operation, scanned records that share the prefix identifier in the table; and
performing the merge operation, wherein the plurality of records to be deleted is prevented from being written to a new extent during the merge operation based at least in part on the annotated manifest.

2. A storage system, comprising:
at least one memory storing computer-executable instructions;
a database storing a plurality of records; and
at least one processor, wherein the at least one processor is configured to access the at least one memory and to execute the computer-executable instructions to:
receive a command to delete a plurality of records comprising a table, where each of the plurality of records are identified based on a prefix identifier common to each record in the table;
insert at least one range tombstone into a memory storage component of the storage system, the range tombstone indicating the plurality of records of the table to be deleted;
perform a flush operation that annotates a manifest of the storage system with data indicating the table that is deleted in the storage system and a time the table was deleted from the storage system, wherein the annotation does not affect extent references in the storage system;
bypass, when reading data from the storage system prior to any merge operation, scanned records that share the prefix identifier in the table; and
perform a merge operation, wherein the indicated plurality of records to be deleted is prevented from being written to a new extent during a flush the merge operation based at least in part on the annotated manifest.

3. A computer-implemented method of deleting records in a log-structured merge (LSM) tree based storage system during a merge operation that writes data from a memory storage component to an extent, comprising:
receiving a command to delete a plurality of records comprising a table, where each of the plurality of records are identified based on a prefix identifier common to each record in the table;
inserting at least one range tombstone into the memory storage component of the storage system, the at least one range tombstone indicating the plurality of records of the table to be deleted;
determining the indicated plurality of records to be deleted are within a large number of small, discontiguous ranges and contain a few number of records therein;
performing a flush operation that annotates a manifest of the storage system with data that indicates an object that is deleted from the storage system and a time that the object was deleted from the storage system, wherein the annotation does not affect extent references in the storage system;
bypassing, when reading data from the storage system prior to the merge operation, scanned records that share the prefix identifier in the table; and
performing the merge operation, wherein the plurality of records to be deleted is prevented from being written to a new extent during the merge operation based at least in part on the annotated manifest.

* * * * *